Sept. 18, 1923.
L. J. GENETT
PISTON RING REMOVER
Filed March 24, 1920
1,468,291
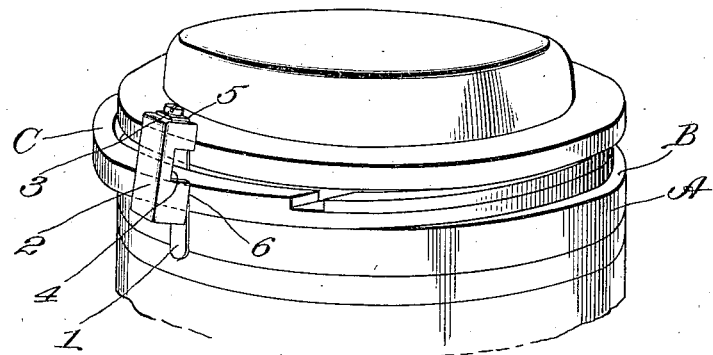
Fig.1.
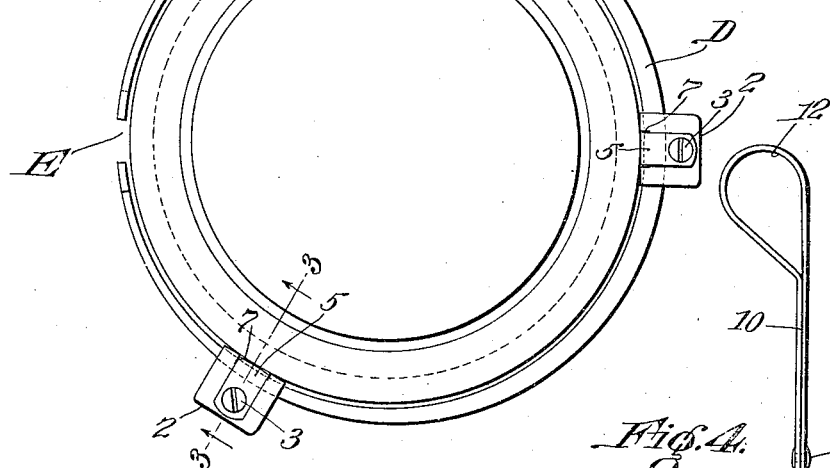
Fig.2.
Fig.4.
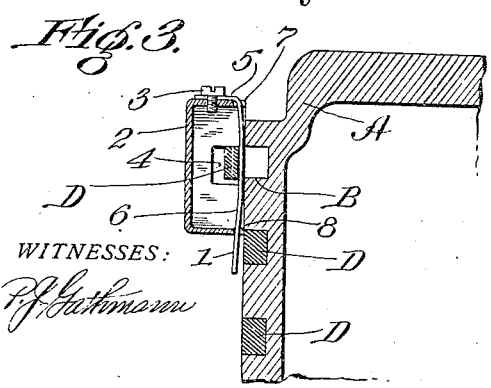
Fig.3.
WITNESSES:
P. J. Gathmann
INVENTOR
Louis J. Genett
BY
Burton & Burton
HIS ATTORNEYS Patented Sept. 18, 1923.

1,468,291

UNITED STATES PATENT OFFICE.

LOUIS J. GENETT, OF MARQUETTE, MICHIGAN, ASSIGNOR OF ONE-HALF TO JOHN M. LONGYEAR, JR., OF MARQUETTE, MICHIGAN.

PISTON-RING REMOVER.

Application filed March 24, 1920. Serial No. 368,291.

*To all whom it may concern:*

Be it known that I, LOUIS J. GENETT, a citizen of the United States, residing at Marquette, in the county of Marquette and the State of Michigan, have invented certain new and useful Improvements in Piston-Ring Removers, of which the following is a specification, reference being had to the accompanying drawings, forming a part thereof.

The purpose of this invention is to provide a simple and inexpensive tool to facilitate the removal of piston rings from pump or engine pistons. It consists of the features and elements of construction hereinafter described and shown in the drawings, as indicated by the claims.

In the drawings:

Figure 1 is a perspective view showing a piston head with a piston ring thereon and a device embodying this invention applied thereto.

Figure 2 is a plan view of a piston head showing a set of three devices embodying this invention applied to the piston ring preparatory to its removal.

Figure 3 is a detail vertical section taken as indicated at line, 3—3, on Figure 2.

Figure 4 is a perspective view of a modified form of piston ring removing devices.

The usual difficulties encountered in attempting to remove piston rings from their pistons for purposes of regrinding, replacing or other repair, are well understood. Figure 1 shows the head of a piston, A, having a groove, B, in which is lodged the piston ring, C. Whether this ring be of the form shown in Figure 1 in which its end portions are lapped upon each other for a considerable distance, or whether it be C-shaped with its ends nearly but not quite in contact,—the type D indicated in Figure 2, it is still a matter of some difficulty to expand the ring sufficiently, against its normal though yielding resistance, to a diameter greater than the outside diameter of the piston, A. The normal inner diameter of any piston ring usually bears such relation to the diameter of the piston at the bottom of the groove, B, that if the ring be eccentrically positioned with respect to the bottom of the groove and in contact with it at one side, the inner circle of the ring will extend slightly beyond the outline of the piston at its opposite side, thus leaving a crevice through which a thin strip of sheet metal can be inserted, and the usual method of removal is to employ three or four such thin strips inserting them one at a time and slipping them around to different positions in the circumference of the ring so as to gradually expand it out of its groove, B, whereupon it may be slipped off over the strips. However, the thin strips of metal easily drop out of position during such adjustment and are quite inconvenient to manipulate.

The present invention contemplates the use of thin strips of sheet metal such as the tongues, 1, but provides each tongue with a holder, 2, to which the strip, 1, is permanently attached by means of a screw or rivet, 3. The holder is formed with a notch at 4, of sufficient width and depth to accommodate the cross section of a piston ring, and the body of the holder, 2, may be a solid block of material or, if preferred, may be made, as shown, in the form of a sheet metal stamping having a back wall, two side walls and two end walls, the notches, 4, being formed in the side walls, as clearly indicated in Figures 1 and 3.

The tongue, 1, is bent substantially at right angles for securement of its upper end portion, 5, under the head of the screw or rivet, 3, and this tongue is of fairly resilient material so that it can be bent away from the holder member, 2, far enough to accommodate the thickness of a piston ring between said tongue, 1, and edge portions, 6, of its side walls just below the notch, 4, in the process of inserting the tongue, 1, between the ring and the piston as illustrated in Figure 1. Ordinarily three devices, each consisting of a tongue, 1, and a holder, 2, will be sufficient to distend the ring if said devices are distributed as indicated in Figure 2, and when so arranged the holders, 2, by reason of their positive engagement with the ring at the notches, 4, will afford convenient means of handling the ring if desired, or if the ring itself is directly grasped, the tongues, 1, will remain with it and will slip off from the piston with the piston ring by reason of their attachment to the holders, 2, and retention of the latter by their notches, 4, engaging the ring. When the ring has been removed from the piston, the three devices are readily removable from the ring either by springing their tongues, 1, away from the holder members to release the ring from notches, 4, or, in the case of a split ring of the type shown at D in Figure 2, the devices may be circumferentially slid around the opening at E and there taken off. With either type of ring its removal from the piston, A, is greatly facilitated and becomes a mere matter of a few positive movements as compared with the old method of uncertain juggling with make-shift expedients.

To facilitate sliding the tongues, 1, circumferentially between the piston ring and the piston for expanding the former, the holders, 2, have formed in their upper and lower ends the notches, 7 and 8, respectively, in which the tongues normally lie and by which the edges of the tongues are engaged for shifting them around the piston.

A modified construction of the invention which is deemed within the scope of the invention is shown in Figure 4 in which the device is made of a single strip of metal, 10, of substantially the same width and thickness as the tongues, 1, shown in Figures 1, 2 and 3. The straight lower end portion, 11, of the strip, 10, constitutes the tongue for insertion between the piston ring and the piston, while the remainder of the strip serves as the holder. At the upper end a loop, 12, is formed to accommodate the finger of the user, and opposite the tongue portion, 11, the strip is bent at 13, forming a recess or notch in which the piston ring is accommodated with shoulders, 14 and 15, adapted to engage its flat faces. Just below this recess the strip is bent away from the tongue portion, 11, at 16, providing a diverging guide which will ride over the edge of a piston ring as the tongue, 11, is inserted between the ring and the piston, thus facilitating the application of the device.

To prevent the parts, 11 and 13, from spreading beyond operable relation, the strip, 10, is riveted at 17, at a point slightly above the bend, 13, that is, at a point about midway between the loop, 12, and the end, 11, as shown.

It may be understood that with either form of the device shown, the replacement of the piston rings may be accomplished by reversing the order of operations,—that is, by applying a plurality of the devices to a piston ring and leading the projecting tongues, 1, over the cylindrical surface of a piston at one end, simultaneously sliding the ring and the devices downward opposite the groove, B, which is to receive the ring and then removing the devices one at a time so as to permit the ring to snap into its groove.

I claim:—

1. In a piston ring remover comprising a thin tongue adapted for insertion between the inner side of a piston ring and the outer wall of its piston and a holder for said tongue having a notch located adjacent the tongue adapted to be occupied by the cross section of the piston ring, said notch having a shoulder extending transversely of said tongue for engaging a flat face of the piston ring and a second shoulder opposite the first and spaced therefrom to engage the opposite flat face of the piston ring.

2. A piston ring remover comprising a thin tongue adapted for insertion between the inner side of a piston ring and the outer wall of its piston, a holder to which said tongue is attached having a shoulder extending transversely of said tongue to engage a flat face of the piston ring, the tongue being a resilient strip of metal having its upper end bent over the end of the holder for securement thereto and its lower end projecting beyond the lower end of the holder for initial entry between the ring and its piston, and a notch in said holder in the lower end thereof normally engaging the lower end portion of said tongue to facilitate forcibly moving the tongue circumferentially between the ring and the wall of the piston.

3. A piston ring remover comprising a thin tongue adapted for insertion between the inner side of the piston ring and the outer wall of its piston, a holder to which said tongue is attached having a shoulder extending transversely of the tongue to engage a flat face of the piston ring, the tongue being a resilient strip of metal having its upper end attached to the holder and said holder having notches positioned respectively above and below its said shoulder to receive the tongue and engage its edges to facilitate sliding said tongue circumferentially between the ring and the wall of the piston.

In testimony whereof, I have hereunto set my hand at Chicago, Illinois, this 20th day of March, 1920.

LOUIS J. GENETT.